Aug. 15, 1961   W. R. TAGGERT   2,996,077
CHECK VALVE
Filed May 8, 1958

WILMER R. TAGGERT
INVENTOR.

United States Patent Office 2,996,077
Patented Aug. 15, 1961

2,996,077
CHECK VALVE
Wilmer R. Taggert, Boylston, Mass., assignor of one-half to Norman S. Blodgett, Worcester, Mass.
Filed May 8, 1958, Ser. No. 733,859
1 Claim. (Cl. 137—537)

This invention relates to a check valve, and more particularly to apparatus permitting the flow of fluid through a conduit in one direction only.

There are many situations in which it is desirable to use inexpensive and rugged check valves to prevent the return of fluid in a line. Such a situation exists in the case of a building where water is being pumped to the outside of a cellar at a higher level. When the pump stops operating, the water in the conduit returns through the pump to the sump, so that the sump is never free of water. These and other deficiencies of the prior art have been obviated in a novel manner by the present invention.

It is, therefore, an outstanding object of the present invention to provide a check valve which an average man can attach of simple, rugged construction which will be inexpensive to manufacture and sell.

A still further object of this invention is the provision of a check valve of such a design that it can be formed of non-corrosive material.

It is another object of the instant invention to provide a check valve which is applicable to the pumping of water or the like, which may have considerable foreign matter entrained therein.

It is another object of the invention to provide a check valve which is applicable to the pumping of water from a sump and will provide a spray at the end of the conduit.

With these and other objects in view, as will be apparent to those skilled in the art, the invention resides in the combination of parts set forth in the specification and covered by the claim appended hereto.

Figure 2:
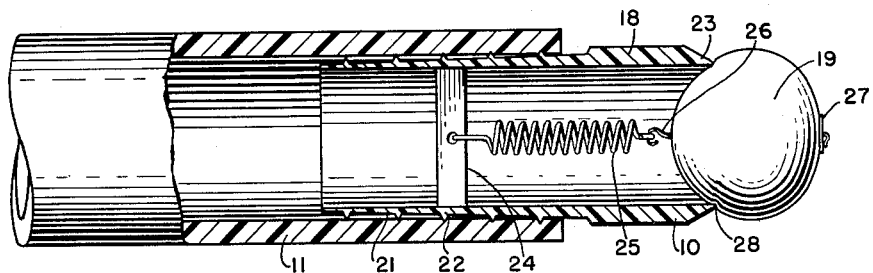
Figure 1:
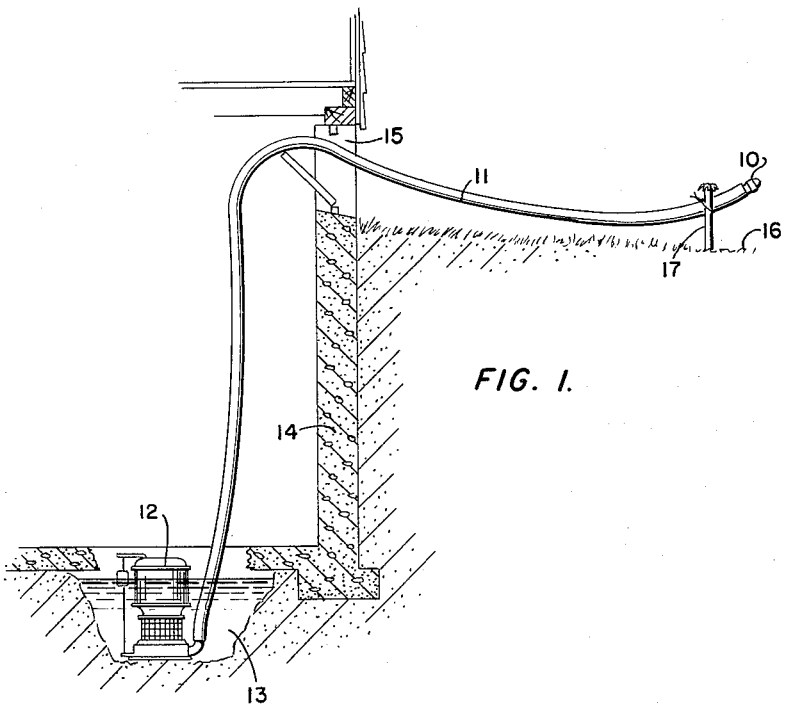

The character of the invention, however, may be best understood by reference to certain of its structural forms, as illustrated by the accompanying drawing in which:

FIG. 1 is a sectional view of a drawing in which the apparatus is used in pumping water from the cellar of a residence, and FIG. 2 is a cross-sectional view of a portion of the apparatus shown in FIG. 1

Referring first to FIG. 1, wherein are shown the general features of the invention, the check valve, indicated generally by the reference numeral 10, is shown in use with a hose 11 connected to the output of a pump 12. The pump lies in a sump 13 in a residence cellar which sump is of the type to which water will drain. The hose extends from the pump 12 through a window 15 in the cellar to the level of the ground 16 externally of the window. The hose may or may not be fastened to a stake 17.

In FIG. 2 it can be seen that the check valve 10 consists of a body member 18 and a ball member 19. The body member 18 may be formed of any number of materials but, as illustrated, it is shown as being formed of a hard plastic, such as polyvinyl plastic. The body member is of tubular form and its external surface is provided with a tapered portion 21 having threads 22 formed thereon. The size of the tapered portion 21 is such as to fit tightly in the end of the hose 11 which is shown as being formed of plastic, but could also be of rubber. It should be noted that one end of the body member 18 is free of the hose 11 and is formed with a bevel 23, forming a rather sharp lip 28 at that end. Across the center of the body member 18 is fastened a bar 24 to the center of which is fastened one end of a coil spring 25; the other end of the coil spring engages a hook formed on the end of a wire 26 which passes through the ball member 19 and is locked at the other side by means of a small washer 27.

The operation of the check valve will now be readily understood in view of the above description. When water accumulates in the sump 13 to a sufficient height, an automatic regulating device, which is well known in the art, will start the pump 12. As the pump operates, it pumps water through the hose 11 and out through the check valve 10. Although the spring 25 normally holds the ball member 19 in engagement with the lip 28 at the end of the body member 18, the pressure of the water will force the ball away from the lip and a gap will be defined therebetween. This gap will be small enough and the pressure of the spring 25 will be great enough to form a spray which may be used to water the lawn or for like desirable purposes. In the past, when the level of water in the sump 13 was lowered sufficiently, the pump was turned off; this meant that in the conventional type of centrifugal pump there is nothing to prevent the water in the vertical portion of the hose from returning through the pump into the sump, so that a considerable body of water remained in the sump even after the pumping action was over. With the present check valve in use at the end of the hose, however, when the pump stops operating, water will attempt to flow backwards through the vertical portion of the hose, but the termination of positive pressure on the ball member 19 will cause it to return to engagement with the lip 28 of the body member 18 providing a tight fit therewith. The ball member is made of a soft, resilient, rubber-like material and it forms a very good seal so that any attempt of water to flow rearwardly in the hose 11 will cause a suction in the hose adjacent the check valve and prevent the return flow of the water that remains in the hose.

It should be noted that the body member 18 and the ball member 19 are made of materials which are non-corrosive so that any chemical material which finds its way to the sump 13 will not damage the valve as it passes through. Furthermore, the spring 25 must be selected with considerable care to provide a tight seal between the ball member 19 and the body member 18, but, nevertheless, to permit the ball member to move away from the body member when sufficient water pressure is available in the hose due to the operation of the pump.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described what is claimed as new and desired to secure by Letters Patent is:

A check valve for use in the end of a rubber hose or the like, comprising a tubular body member having an exterior surface tapered at one end and ridged, the other end of the body member being beveled to form a sharp lip, the tapered surface having its smaller end located at the end of the body member opposite the sharp lip, a ball member of generally spherical shape formed of a rubber-like material, a hook having a long shank extending through the ball member and fastened thereto, a bar fastened across the intermediate portion of the body member at a thinner portion thereof in the part occupied by the tapered surface, and a coil spring connected in tension between the bar and the hook to bias the ball member toward engagement with the said sharp lip at the said other end of the body member.

References Cited in the file of this patent

UNITED STATES PATENTS

| | | |
|---|---|---|
| 82,844 | Jenkins | Oct. 6, 1868 |
| 109,813 | Evans | Dec. 6, 1870 |
| 314,218 | Bolton | Mar. 24, 1885 |
| 983,122 | Charles | Jan. 31, 1911 |
| 1,331,370 | Pitcher | Feb. 17, 1920 |
| 1,379,474 | Osborne | May 24, 1921 |
| 2,241,758 | Baldine | May 13, 1941 |
| 2,418,200 | Smith | Apr. 1, 1947 |

FOREIGN PATENTS

| | | |
|---|---|---|
| 90,523 | Sweden | Oct. 12, 1937 |